(12) United States Patent
Sawai et al.

(10) Patent No.: US 6,429,975 B1
(45) Date of Patent: Aug. 6, 2002

(54) ILLUMINATION OPTICAL SYSTEM AND PROJECTOR USING SAME

(75) Inventors: Yasumasa Sawai, Yamatotakada; Hisashi Tokumaru, Kawachinagano; Nobuo Mushiake, Kawachi-Gun, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/708,765

(22) Filed: Nov. 8, 2000

(30) Foreign Application Priority Data

Nov. 25, 1999 (JP) ............................................. 11-333750

(51) Int. Cl.[7] .......................... G02B 27/14; G02B 27/10
(52) U.S. Cl. ....................................... 359/634; 359/627
(58) Field of Search ................................ 359/618, 619, 359/627, 634; 353/32, 33

(56) References Cited

U.S. PATENT DOCUMENTS

| 5,381,278 A | 1/1995 | Shingaki et al. ............ 359/256 |
| 5,387,953 A | 2/1995 | Minoura et al. ............... 353/20 |
| 5,751,480 A * | 5/1998 | Kitagishi .................... 359/485 |
| 6,005,655 A | 12/1999 | Mushiake et al. ............. 355/31 |
| 6,067,193 A * | 5/2000 | Sekine et al. ................ 359/489 |
| 6,176,583 B1 * | 1/2001 | Sawai ......................... 353/20 |

FOREIGN PATENT DOCUMENTS

JP                112782 A  *  1/1999  ........... G02B/27/28

* cited by examiner

Primary Examiner—Ricky Mack
(74) Attorney, Agent, or Firm—Sidley Austin Brown & Wood LLP

(57) ABSTRACT

An illumination optical system has a lens array for dividing light from a light source into a plurality of beams of light; a polarized light conversion optical system having a separator and converter, wherein the separator has a prism array comprising a plurality of right angle prisms arranged consecutively with the same surface being an inclined surface for reflecting the plurality of beams of light by the inclined surface and separating the plurality of reflected beams of light into first and second linearly polarized light beams having mutually intersecting polarization directions, and the converter converts the polarization direction of one of the first and second linearly polarized light beams to the other polarization direction, wherein the lens cell width of the lens array is greater than the prism array pitch of the prism array viewed from the incidence side of the plurality of beams of light.

15 Claims, 2 Drawing Sheets

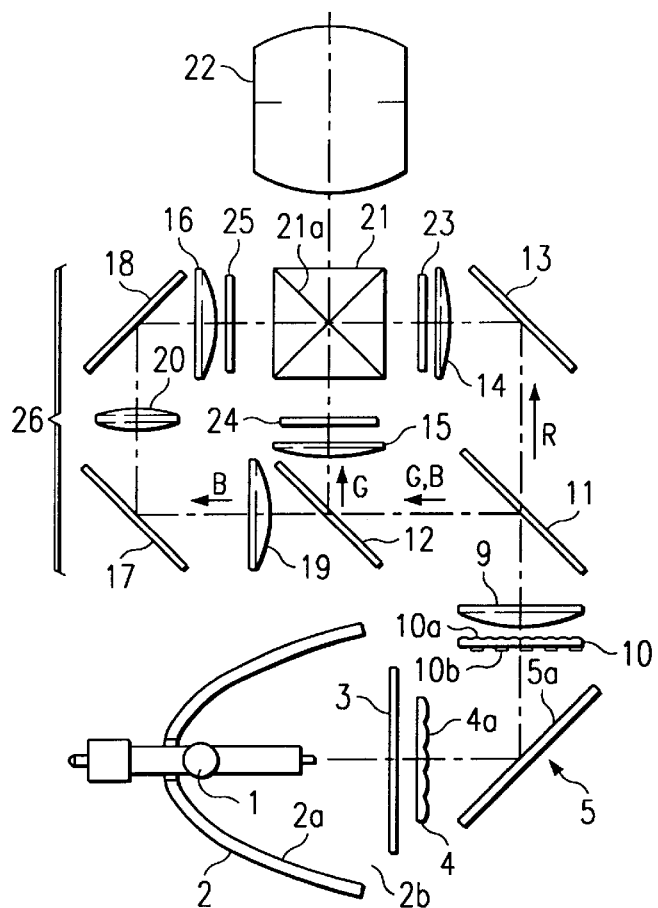
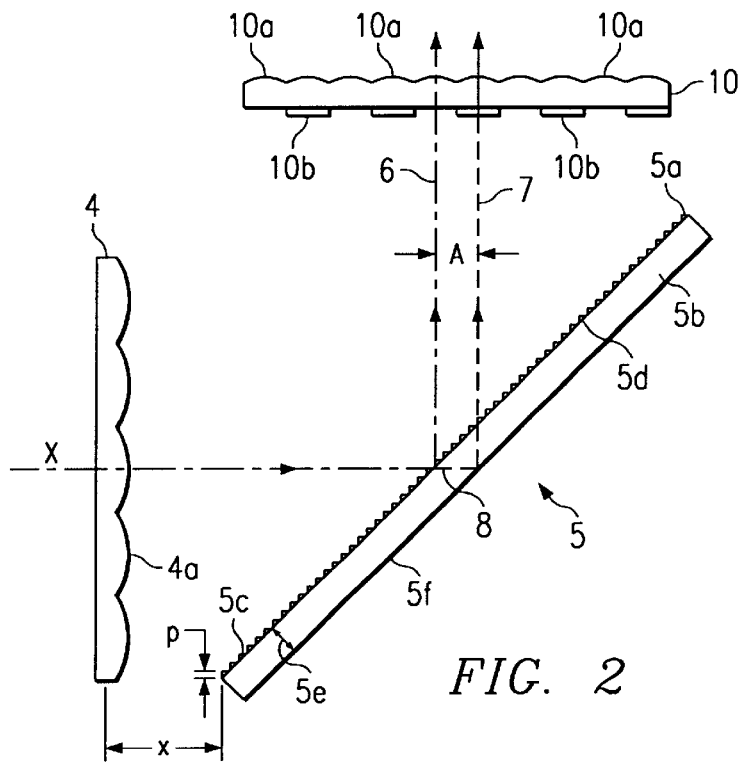
FIG. 1
FIG. 2

ILLUMINATION OPTICAL SYSTEM AND PROJECTOR USING SAME

RELATED APPLICATIONS

The present application is based on Patent Application No. 11-333750 filed in Japan, the content of which is hereby incorporated by reference.

BACKGROUND OF THE INVENTION

1. Field of the Invention

The present invention relates to an illumination optical system, and specifically relates to an illumination optical system provided with a polarization light conversion optical system. The present invention further relates to a projector which uses this illumination optical system for projecting an optical image on a screen.

2. Description of the Related Art

Conventional projectors are known which illuminate an optical image formed by an image display element such as a liquid crystal panel or the like in accordance with a projection image signal, and project this illuminated optical image on a screen via a projection lens. In such a projector illumination optical system, conventionally a triangular prism type polarization beam splitter is used in the polarization conversion optical system. The triangular prism type polarization beam splitter has been a chief factor preventing the design of light weight liquid crystal projectors due to the heavy weight of the right angle prism included therein.

The present applicant(s) have disclosed, in U.S. Pat. No. 6,005,655, a construction which provides divided prism to reduce the weight of the right angle prism, and positions the prism ridgeline at the boundary of the lens cell of a first lens array comprising an optical integrator so as to prevent the projection of the unsharp image of the ridgeline on the screen.

There is demand for lighter weight and less expensive projectors, and it follows that the polarization conversion optical system in the illumination optical system must be made lighter in weight with reduced cost.

SUMMARY OF THE INVENTION

An object of the present invention is to provide an improved illumination optical system.

A specific object of the present invention is to provide a light-weight and less expensive illumination optical system for the polarization conversion optical system.

A further object of the present invention is to provide a light-weight and low cost projector.

These objects are attained by an illumination optical system and a projector provided with same, the illumination optical system comprising:

a light source;

a lens array for splitting the light from the light source into a plurality of beams of light;

a polarized light conversion optical system having a separator and converter, wherein the separator has a prism array comprising a plurality of right angle prisms arranged consecutively with the same surface being an inclined surface for reflecting the plurality of beams of light by the inclined surface and separating the plurality of reflected beams of light into first and second linearly polarized light beams having mutually intersecting polarization directions, and the converter converts the polarization direction of one of the first and second linearly polarized light beams to the other polarization direction;

and wherein the lens cell width of the lens array is greater than the prism array pitch of the prism array viewed from the incidence side of the plurality of beams of light.

BRIEF DESCRIPTION OF THE DRAWINGS

These and other objected and features of this invention will become apparent from the following description, taken in conjunction with the preferred embodiments with reference to the accompanying drawings in which:

FIG. 1 schematically shows the structure the optical system of an embodiment of a liquid crystal projector;

FIG. 2 is an enlargement schematically showing the structure of an embodiment of the polarization conversion optical system.

DESCRIPTION OF THE PREFERRED EMBODIMENTS

Figure 3:
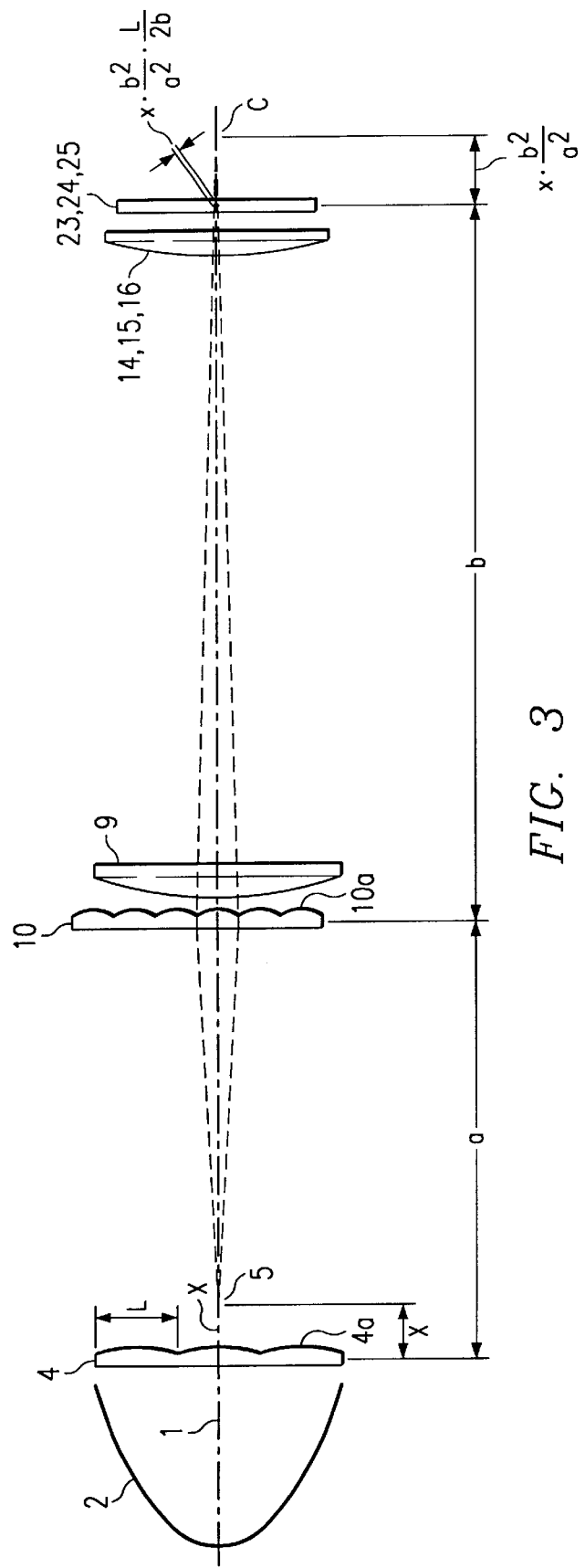
FIG. 3 schematically shows the main structure of the embodiment of the illumination optical system in a linear view.

The embodiments of the present invention are described hereinafter with reference to the accompanying drawings. FIG. 1 schematically shows the structure of an embodiment of the optical system of a liquid crystal projector. In the drawing, reference number 1 refers to a light source which emits a randomly polarized white light. A metal halide lamp, xenon lamp, or halogen lamp may be used in the light source 1. Reference number 2 refers to a reflector having a reflective surface 2a a part of the surface of which is formed with symmetrical cross section and includes the pole of paraboloid revolution, and reflects the impinging light emitted from the light source 1 arranged at a focus position to the exterior side (to the right in the drawing) of an aperture 2b.

Reference number 3 refers to an ultraviolet-infrared (UV-IR) cutting filter arranged in the vicinity of the aperture 2b, which eliminates light of the unnecessary wavelength range with regard to the light of the primary colors. Reference number 4 refers to a first lens array which comprises the optical integrator and has a plurality of lens cells 4a arranged two-dimensionally, which eliminates light of the unnecessary wavelength range with regard to the light of the primary colors, and the light reflected by the reflecting surface 2a of the reflector 2 entering the first lens array 4 is split into a plurality of beams of light and emitted therefrom. The aperture shape of the plurality of lens cells 4a are identical.

Reference number 5 refers to a polarization conversion prism array, which is the separator of the polarization conversion optical system having a plurality of right angle prisms arranged at slight pitch forming the prism array 5a. The back surface being the inclined surface of the prism array 5a is arranged at an angle of 45 degrees with regard to the optical axis of the first lens array 4, such that the plurality of beams of light separated by the first lens array 4 is optically separated into two linear polarized light components having mutually intersecting polarization directions.

Reference number 10 refers to a second lens array which comprises the optical integrator, and has lens cells 10a of an identical number to the total number of beams of light of the two linear polarized light components separated by the polarization conversion prism array 5. A ½ wavelength plate 10b for converting the polarization direction to match that of the other beam of light is arranged in the area of impingement of one of the two linear polarized light components within the incidence surface of the second lens array 10. The ½ wavelength plate 10*b* is the converter of the polarization conversion optical system, and forms the polarization conversion optical system together with the previously mentioned polarization conversion prism array 5. Details of the structure of this polarization conversion optical system are described later.

Reference numbers 23~25 refers to transmission-type liquid crystal panels, which forms optical images of the red light R, green light G, and blue light B within the primary colors RGB. The image of each lens cell 4*a* of the first lens array 4 is superimposed in each liquid crystal panel by the second lens array 10 and the superimposition lens 9 arranged directly behind the second lens array 10. Reference numbers 11 and 12 refer to dichroic mirrors which comprise the color separation means for separating each of the three primary colors. In this way the light of the primary colors can illuminate the three corresponding liquid crystal panels 23~25.

The dichroic mirror 11 transmits the beam of red light R, and reflects the beam of green light G and blue light B. Reference number 13 refers to a reflective mirror for directing the red light R transmitted through the dichroic mirror 11 to the liquid crystal panel 23, and reference number 14 refers to a condenser lens for illuminating the liquid crystal panel 23 with the red light R reflected by the reflective mirror 13.

The dichroic mirror 12 transmits the beam of blue light B and reflects the luminous flux of the green light G within the beam of the green light G and the blue light B reflected by the dichroic mirror 11. Reference number 15 refers to a condenser lens for illuminating the liquid crystal panel 24 with the green light G reflected by the dichroic mirror 12. Lenses 19 and 20 and reflective mirrors 17 and 18 comprise a relay optical system 26 as an equal magnification optical system for directing the blue light B transmitted through the dichroic mirror 12 to the liquid crystal panel 25 while maintaining the brightness of the blue light B. Reference number 16 refers to a condenser lens for illuminating the liquid crystal panel 25 with the blue light B directed by the relay optical system 26.

The illumination lights are condensed to telecentric beams by the condenser lenses, and the liquid crystal panels are uniformly illuminated including incidence angle characteristics. Polarization plates not shown in the drawings are arranged in front and behind the liquid crystal panels, such that only the illumination light of a specific polarization direction is incident to the liquid crystal panel, each pixel is modulated, and only specific light is emitted as projection light.

FIG. 2 is an enlargement schematically showing the structure of the polarization conversion optical system of the embodiment. In the drawing, the polarization conversion prism array 5 comprises the prism array 5*a* comprising a plurality of right angle prisms arranged at pitch p when viewed from the incidence side, and a parallel plate 5*b* cemented to the back surface thereof The back surface, which is the inclined surface of the prism array 5*a*, is arranged so as to form an angle of 45 degrees with regard to the optical axis X of the first lens array 4, and the plurality of beam of light separated by the first lens array 4 are optically separated into light 6 of the first linear polarized light component and light 7 of a second linear polarized light component having mutually intersection directions of polarization. The prism array 5*a* is an integrated type formed of glass or resin. The distance between the first lens array 4 and the polarization conversion prism array 5 is designated x.

A polarization-separation surface 5*d* is formed between the parallel plates 5*b* on the back surface which is the inclined surface of the prism array 5*a*, and within the light entering from the first lens array 4, the first linear polarized light component (S-polarized light in this instance) is reflected at a right angle relative to the incidence angle of 45 degrees by the polarization-separation surface 5*d*, and exits as beam 6. A completely reflective surface 5*f* is formed opposite, interposed at a thickness 5*e* of the parallel plate 5*b*, from the polarization-separation surface 5*d*, and within the light entering from the first lens array 4, a second linear polarized light component (P-polarized light in this instance) intersecting the first linear polarized light component is transmitted through the polarization-separation surface 5*d*, and reflected by the totally reflective surface 5*f* at a right angle relative to the incidence angle of 45 degrees, is again transmitted through the polarization-separation surface 5*d*, and exits as beam 7. The dimension of the thickness 5*e* is set based on the pitch at which the beam 6 and the beam 7 exits (i.e., the pitch of the lens cell 10*a* of the second lens array 10, and the square root of twice the thickness 5*e*).

The second lens array 10 which comprises the optical integrator is arranged two-dimensionally in the vicinity of the plurality of converging beams 6 and 7 separated by the polarization-conversion prism array 5, and has lens cells 10*a* in a number identical to the total number of the plurality of beams 6 and 7. That is, the number of lens cell 10*a* of the second lens array 10 is a multiple of the lens cells 4*a* of the first lens array 4. Two laterally adjacent lens cells 10*a* in the drawing correspond to a single lens cell 4*a*. A ½ wavelength plate 10*b* is arranged within the incidence surface of the second lens array 10 in the area in which the beam 7 is incident, to convert the second linear polarized light of beam 7 to the same polarization direction as the first linear polarized light component of beam 6. The ½ wavelength plate 10*b* may be disposed on the emergence surface side of the second lens array 10.

FIG. 3 schematically shows the main structure of the illumination optical system of the present embodiment expanded linearly. The symbols in the drawing are defined below.

x represents the distance between the first lens array 4 and the polarization-conversion prism array 5 (only position shown);

a represents the focal length of the first lens array 4, i.e., the distance between the first lens array 4 and the second lens array 10;

b represents the distance between the second lens array 10 and the liquid crystal panels 23, 24, 25;

L represents the width of the lens cell 4*a* of the first lens array 4.

The correspondence of the condenser lenses 14, 15, 16 to the liquid crystal panels 23, 24, 25 is described in FIG. 1. The number of divisions of the lens array in the drawing matches FIG. 2.

Since the first lens array 4 and the liquid crystal panels 23, 24, 25 is an optically conjugate relationship, the prism ridgeline 5*c* described in FIG. 2 on the polarization-conversion prism array 5 at a distance x from the first lens array 4 forms an image at a position C at which the focal point is shifted only $x(b^2/a^2)$ from the liquid crystal panel surface as shown in FIG. 3. The broadening of the unsharp image on the liquid crystal panel surface generally becomes $(x(b^2/a^2)(L/2b))$ because the width of the lens cell 10*a* of the second lens array 10 is L/2.

On the other hand, the pitch of the prism ridgeline 5*c* projecting the unsharp image on the liquid crystal panel surface becomes p(b/a). In this case, p represents the pitch of the prism array 5a shown in FIG. 2. At this time, as the unsharp image of the prism ridgeline becomes larger than the pitch, the unsharp image becomes relatively inconspicuous. Accordingly, it is desirable that the following conditions are satisfied.

$$(x \cdot b^2/a^2) \cdot (L/2b) \geq p \cdot b/a$$

Thus, $x \geq 2a \cdot p/L$.

In the structure disclosed in U.S. Pat. No. 6,005,655, since the prism ridgeline is arranged in the boundary of the lens cells of the first lens array, the prism cannot be divided smaller than the width of the lens cells of the first lens array, whereas in the present embodiment the prism is divided smaller than the lens cell, and the width of the lens cell of the first lens array is larger than the prism array pitch.

In the present embodiment, the width L of the lens cell 4a of the first lens array 4 is desirably 20 times or greater the pitch p of the prism array 5a. In this way the distance x is reduced between the first lens array 4 and the polarization-conversion prism array 5, thereby minimizing the space used for arrangement of the optical elements, as well as rendering the unsharp image of the prism ridgeline less conspicuous and ensuring that a reduction in image quality is prevented.

It is further desirable in the present embodiment that the pitch p of the prism array 5a is 2 mm or less. In this way the prism array is readily manufactured using glass or resin forming, thereby reducing cost.

The operation of the present embodiment is again described below. In FIG. 1, a beam of random polarized light emitted from the light source 1 is reflected by the reflective surface 2a of the reflector 2, and emerges from the aperture 2b to the exterior side as nearly parallel light. Then, light unnecessary to the RGB colors is eliminated by the UV-IR cutting filter 3. The eliminated light of unnecessary wavelengths is split into a plurality of beams by the first lens array 4.

Then, in FIG. 2, the plurality of beams split by the first lens array 4 are separated into beam 6 of a first linear polarized light component (S-polarized light) and beam 7 of a second linear polarized light component (P-polarized light) having mutually intersecting polarization directions by the polarization-conversion prism array 5. At this time, the first lens array 4, polarization-conversion prism array 5, and the second lens array 10 have a specific relationship which satisfies the previously described conditions, and since the pitch p of the prism array 5a is thoroughly small, the unsharp image of the prism ridgeline 5c is inconspicuous.

Repeating the description, within the light entering the polarization-conversion prism array 5 from the first lens array 4, the first linear polarized light component is reflected at right angle by the polarization-separation surface 5d, and emerges as beam 6. The second linear polarized light component is transmitted through the polarization-separation surface 6d passing directly through the optical path 8 created by the thickness 5e of the parallel plate 5b, and reflected at right angle to the incidence angle of 45 degrees by the totally reflective surface 5f, and emerges as beam 7.

The plurality of beams 6 and 7 form individually small light sources of identical number to the plurality of beams divided by the first lens array 4 in the vicinity of the second lens array 10 via the image forming action of the first lens array 4. At this time, the small light source formed by the beam 7 relative to the small light source formed by the beam 6, is a beam 7 forming an image having a horizontal shift A equal to the distance passing through the optical path 8 via the thickness 5e between the polarization-separation surface 5d and the totally reflective surface 5f.

The thickness 5e between the polarization-separation surface 5d and the totally reflective surface 5f is set such that the horizontal shift A is equal to half the spacing of the small light sources formed by the plurality of beams 6. As a result, in the vicinity of the second lens array 10, the small light sources of the beam 6 and the small light source of the beam 7 appear alternatingly at each interval of horizontal shift A. The total number of small light sources is equal to twice the number of the plurality of beams divided by the first lens array 4.

The polarization direction of the second linear polarized light component of beam 7 is converted to the same direction as the polarization direction of the first linear polarized light component of beam 6 by mounting a ½ wavelength plate 10b at the incidence surface of the lens cell 10a at the position at which the small light source is formed by the beam 7, so as to render uniform the polarization direction of all small light sources. All the polarized light becomes S-polarized light in the present embodiment. In this way the beams emitted from all small light sources can be used to illuminate the three liquid crystal panels 23, 24, 25.

Referring now to FIG. 1, the plurality of beams directed to the second lens array 10 pass through the superimposition lens 9, and are separated into RGB colors by the dichroic mirrors 11 and 12. That is, the beam of red light R passing through the dichroic mirror 11 is reflected by the reflective mirror 13, and after passing through the condenser lens 14, illuminates the liquid crystal panel 23. The beam of green light G and blue light B are both reflected by the dichroic mirror 11, and the beam of green light G is reflected by the dichroic mirror 12, whereas the beam of blue light B is transmitted therethrough.

The beam of green light G reflected by the dichroic mirror 12 passes through the condenser lens 15, and thereafter illuminates the liquid crystal panel 24. The beam of blue light B transmitted through the dichroic mirror 12 is directed to a relay optical system 26 comprising two reflective mirrors 17 and 18 and two lenses 19 and 20, and thereafter passes through a condenser lens 16, and illuminates the liquid crystal panel 25. Since the distance between the liquid crystal panel 25 and the second lens array 10 differs from the distance between the liquid crystal panels 23 and 24 and the second lens array 10, the illumination condition of the liquid crystal panel 25 and the illumination condition of the liquid crystal panels 23 and 24 are equalized using the lenses 19 and 20 of the relay optical system 26.

Each lens cell 4a of the first lens array 4 and the three liquid crystal panels 23~25 have an optically conjugate relationship, and since the plurality of beams divided by the first lens array 4 are superimposed on the liquid crystal panels 23~25, the liquid crystal panels 23~254 have uniform illumination distribution. In this way each RGB image displayed on the liquid crystal panels 23~25 is combined by the dichroic mirror 12, and projected on the screen as a color image of uniform illumination distribution by the projection optical system 22.

The lens array used in the claims correspond to the first lens array in the embodiment, and the separator corresponds to the polarization-conversion prism array.

According to the above embodiment, in the illumination optical system and liquid crystal projector using same, reduction of image quality is prevented, and the polarization-conversion optical system can be made light weight and at lower cost.

Specifically, light-weight and low cost prism is obtained by using a prism array comprising a plurality of prisms arranged at small pitch in the separator of the polarization-conversion optical system.

Furthermore, by having the unsharp image of the prism ridgeline larger than the pitch, the unsharp image is made relatively inconspicuous.

The prism array is readily manufactured at lower cost using glass or resin forming, by setting the prism array pitch at 2 mm or less.

When the lens cell width of the first lens array is 20 times or greater the prism array pitch, the space required for disposition of the optical elements is minimized, the unsharp image of the prism ridgeline is inconspicuous, and reduction of image quality is reliably prevented.

Furthermore, by using a prism array such as the polarization-conversion optical system as an illumination optical system, a light-weight, low cost liquid crystal projector can be realized.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An illumination optical system comprising:

a lens array for dividing light from a light source into a plurality of beams of light;

a polarized light conversion optical system having a separator and converter, wherein the separator has a prism array comprising a plurality of right angle prisms arranged consecutively, a surface of the prism array being an inclined surface for reflecting the plurality of beams of light and separating the plurality of reflected beams of light into first and second linearly polarized light beams having mutually intersecting polarization directions, and the converter converts the polarization direction of one of the first and second linearly polarized light beams to the other polarization direction; and wherein a lens cell width of the lens array is greater than a prism array pitch of the prism array when viewed from an incidence side of the plurality of beams of light.

2. An illumination optical system claimed in claim 1, wherein the following condition is satisfied:

$$X \geq 2a \cdot p/L$$

where

X represents a distance between the lens array and the separator;

a represents a focal length of the lens array;

L represents the lens cell width of the lens array; and p represents the prism array pitch.

3. An illumination optical system claimed in claim 1, wherein the prism array pitch is 2 mm or less.

4. An illumination optical system claimed in claim 1, wherein the lens cell width of the lens array is 20 times, or greater, the prism array pitch.

5. An illumination optical system comprising:

an optical integrator comprising a first lens array and a second lens array having a plurality of lens cells arranged two-dimensionally, wherein the first lens array separates light from a light source into a plurality of beams of light; and a polarized light conversion optical system having a separator and converter, wherein the separator has a prism array comprising a plurality of right angle prisms arranged consecutively, a surface of the prism array being an inclined surface for reflecting the plurality of beams of light and separating the plurality of reflected beams of light into first and second linearly polarized light beams having mutually intersecting polarization directions, and the converter converts the polarization direction of one of the first and second linearly polarized light beams to the other polarization direction, and the prism array is arranged between the first lens array and the second lens array of the optical integrator, and the converter forms the second lens array;

wherein a lens cell width of the first lens array is greater than a prism array pitch of the prism array when viewed from an incidence side of the plurality of beams of light.

6. An illumination optical system claimed in claim 5, wherein the following condition is satisfied:

$$X \geq 2a \cdot p/L$$

where

X represents a distance between the first lens array and the separator;

a represents a focal length of the first lens array;

L represents the lens cell width of the first lens array; and p represents the prism array pitch.

7. An illumination optical system claimed in claim 5, wherein the prism array pitch is 2 mm or less.

8. An illumination optical system claimed in claim 5, wherein the lens cell width of the first lens array is 20 times, or greater, the prism array pitch.

9. An illumination optical system claimed in claim 5, wherein a superimposition lens is arranged between the second lens array and an illuminated surface.

10. A projector comprising:

a light source for emitting illumination light;

a display element for displaying an optical image;

an illumination optical system for illuminating an optical image on the display element by illumination light from the light source, wherein the illumination optical system includes:

a polarized light conversion optical system having a separator and converter, wherein the separator has a prism array comprising a plurality of right angle prisms arranged consecutively, a surface of the prism array being an inclined surface for reflecting the plurality of beams of light by the inclined surface and separating the plurality of reflected beams of light into first and second linearly polarized light beams having mutually intersecting polarization directions, and the converter converts the polarization direction of one of the first and second linearly polarized light beams to the other polarization direction, and the prism array is arranged between a first lens array and a second lens array of an optical integrator, and the converter forms the second lens array, wherein a lens cell width of the first lens array is greater than a prism array pitch of the prism array when viewed from an incidence side of the plurality of beams of light; and a projection optical system for projecting the optical image on the display element illuminated by the illumination light emitted from the illumination optical system on a specific image plane.

11. A projector claimed in claim 10, wherein the following condition is satisfied:

$$X \geq 2a \cdot p/L$$

where

X represents a distance between the first lens array and the separator;

a represents a focal length of the first lens array;

L represents the lens cell width of the first lens array; and p represents the prism array pitch.

12. A projector claimed in claim 10, wherein the prism array pitch of the illumination optical system is 2 mm or less.

13. A projector claimed in claim 10, wherein the lens cell width of the first lens array of the illumination optical system is 20 times, or greater, the prism array pitch.

14. A projector claimed in claim 10, wherein the display element is a transmission type liquid crystal panel.

15. A projector claimed in claim 10, wherein the display element is a plurality of layers and provided with a color separation means for separating each color in an illumination light path so as to illuminate the plurality of layers, respectively.

* * * * *